United States Patent
Bernhardt et al.

(10) Patent No.: US 7,642,958 B2
(45) Date of Patent: Jan. 5, 2010

(54) SATELLITE POSITIONING SYSTEM RECEIVERS AND METHODS

(75) Inventors: Bruce A. Bernhardt, Wauconda, IL (US); William P. De Clerck, Palatine, IL (US); Michael W. Schellinger, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 159 days.

(21) Appl. No.: 11/158,127

(22) Filed: Jun. 21, 2005

(65) Prior Publication Data

US 2006/0284765 A1 Dec. 21, 2006

(51) Int. Cl.
*G01S 1/00* (2006.01)
*G01C 21/30* (2006.01)
*H04W 24/00* (2006.01)

(52) U.S. Cl. .............. 342/357.09; 701/211; 455/456.1

(58) Field of Classification Search ............. 701/211; 342/357, 357.09; 455/456
See application file for complete search history.

(56) References Cited

U.S. PATENT DOCUMENTS

| 5,731,978 | A | 3/1998 | Tamai et al. |
| 6,185,427 | B1 | 2/2001 | Krasner et al. |
| 6,362,778 | B2 * | 3/2002 | Neher ............... 342/357.07 |
| 6,703,971 | B2 * | 3/2004 | Pande et al. ......... 342/357.09 |
| 6,760,662 | B2 | 7/2004 | Lee |
| 2001/0026240 | A1 * | 10/2001 | Neher ............... 342/357.07 |
| 2002/0154058 | A1 * | 10/2002 | Pande et al. ......... 342/357.09 |
| 2003/0236619 | A1 | 12/2003 | Dorian et al. |
| 2004/0192352 | A1 * | 9/2004 | Vallstrom et al. ...... 455/456.6 |
| 2006/0190168 | A1 * | 8/2006 | Ohnishi et al. .......... 701/211 |
| 2006/0208169 | A1 * | 9/2006 | Breed et al. ............ 250/221 |

FOREIGN PATENT DOCUMENTS

| EP | 1043599 A2 | 10/2000 |
| WO | 2004083888 A2 | 9/2004 |
| WO | 2004097446 A2 | 11/2004 |

* cited by examiner

*Primary Examiner*—Thomas H Tarcza
*Assistant Examiner*—Harry Liu
(74) *Attorney, Agent, or Firm*—Roland K. Bowler, II

(57) ABSTRACT

A mobile wireless communication device (200) including a wireless transceiver (210) communicably coupled to a processor (220), a satellite positioning system receiver (250), wherein the processor controls an operating mode of the satellite positioning system receiver based on satellite positioning system operating mode information received by the wireless transceiver when the mobile wireless communication device is in a vicinity of a location or will be in the vicinity on which the satellite positioning system operating mode information is based. Controlling the operating mode includes controller whether and when and the frequency with which location measurements are made.

20 Claims, 3 Drawing Sheets

SATELLITE POSITIONING SYSTEM RECEIVERS AND METHODS

FIELD OF THE DISCLOSURE

The present disclosure relates generally to satellite positioning system receivers, and more particularly to controlling satellite positioning system receivers in wireless communication devices, for example, in cellular communication handsets, based on the location of the device, and corresponding devices and methods.

BACKGROUND OF THE DISCLOSURE

In some satellite positioning system receivers (SPS) also referred to herein as global positioning system receivers (GPS), for example, battery-operated portable NAVSTAR GPS receivers, designers must consider a tradeoff between power consumption and operation of the SPS engine. In SPS based navigation applications, for example, battery power consumption depends on the rate or frequency at which the SPS engine computes pseudoranges and generates positioning, heading, speed and other information for the navigation application. In many SPS receiver applications, including some navigation and routing applications, the SPS engine must generally operate relatively continuously to provide the accuracy and performance expected by consumers. This sustained operation consumes power and may require the allocation of substantial computational resources, one or both of which may be in limited supply.

U.S. Publication No. 2003/0236619 entitled "Low Power Position Locator" discloses a device for determining user position including a GPS receiver that intermittently determines a reference position at a relatively low frequency duty cycle to reduce power consumption. In U.S. Publication No. 2003/0236619, a user's current position is determined using the reference position and change information relative to the reference position detected by a comparatively low power consumption inertial sensor system. In one embodiment of U.S. Publication No. 2003/0236619, the duty cycle of the GPS received is fixed, and in another embodiment the duty cycle is variable depending upon whether the change in position detected by the inertial sensor system exceeds a specified limit.

U.S. Pat. No. 5,731,978 entitled "Method And Apparatus For Enhancing Vehicle Navigation Through Recognition of Geographical Region Types" discloses a vehicle navigation system capable of altering parameters of a navigation algorithm based on changes in the geographical region, for example, changes indicated by the digitization density of a map database, where the vehicle is located. The navigation system of U.S. Pat. No. 5,731,978, for example, provides extra user guidance in hilly terrains and eliminates extraneous maneuvers in densely populated areas. U.S. Pat. No. 5,731,978 also discloses adjusting the size of search regions employed to identify position possibilities based on the density and regularity of the layout, for example, street grids, in the map database.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
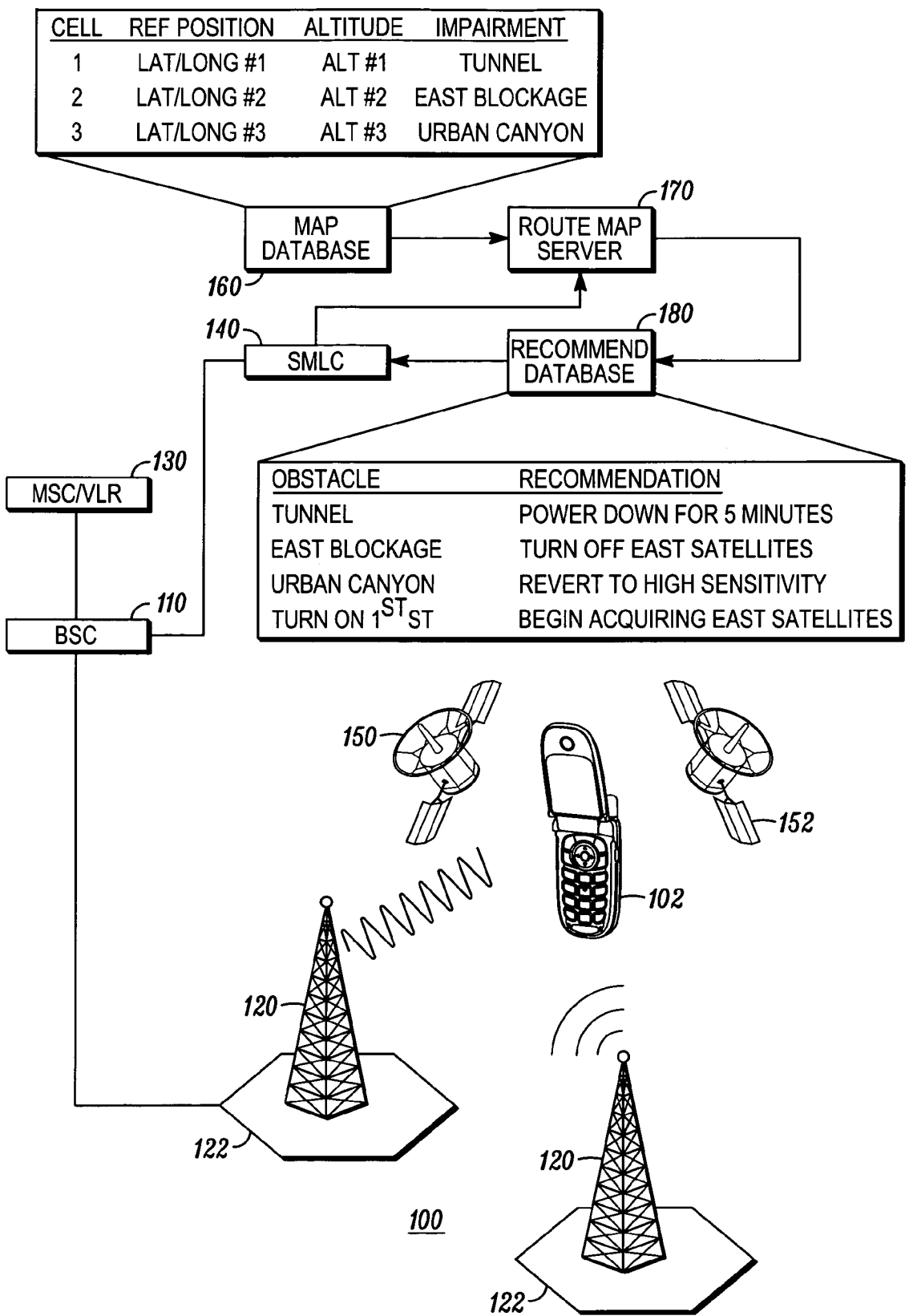
FIG. 1 is an exemplary wireless communication system.

In FIG. 1, the exemplary wireless communication system 100 comprises generally one or more base station controllers (110) each of which is communicably coupled to one or more base transceiver stations 120. The network of base transceiver stations 122 forms a relatively contiguous patchwork of cellular communication coverage areas. The base station controllers 110 are communicably coupled to a mobile switching center (MSC) and visitor location register (VLR) 130. The functionality of the MSC and VLR may be integrated in a common entity as illustrated or it may be located separately. Wireless communication terminals, for example, mobile station 102 in FIG. 1, are capable of communicating with other terminals connected to the network and with other networks as is known generally by those having ordinary skill in the art.

Exemplary cellular communication networks include 2.5 Generation 3GPP GSM networks, 3rd Generation 3GPP WCDMA networks, and 3GPP2 CDMA communication networks, among other existing and future generation cellular communication networks. While the exemplary communication system of FIG. 1 is a cellular communication network, the wireless terminal 102 may operate in or with other networks, including trunked networks, adhoc networks comprising one or more other wireless terminals, and wire-line communication networks, among others.

Figure 2:
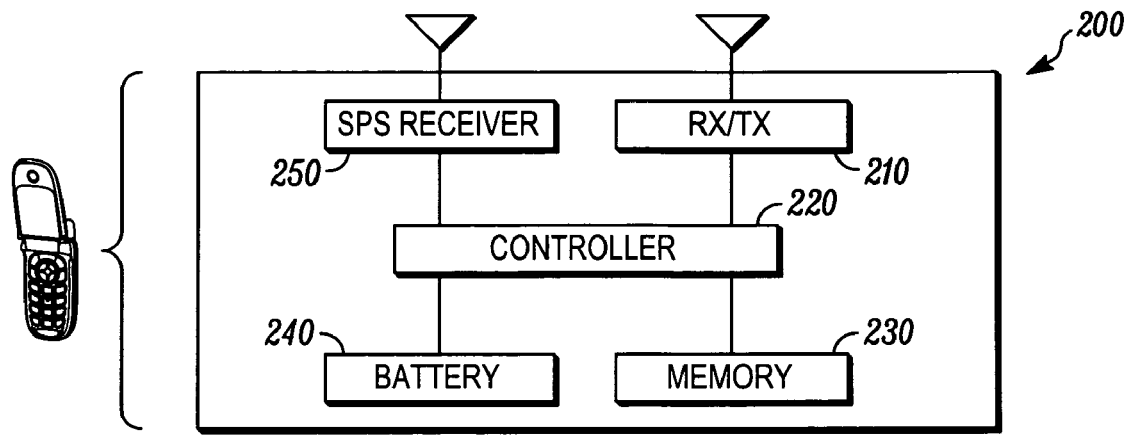
FIG. 2 is an exemplary satellite positioning system receiver integrated in a wireless handset.

In FIG. 2, the wireless communication terminal 200 comprises generally a wireless radio frequency transceiver 210 capable of communicating voice and/or data in one of the exemplary networks discussed above. The wireless terminal also includes a processor 220, for example, a digital microprocessor and/or a digital signal processor (DSP). The processor is communicably coupled to memory 230, which generally includes random accessible memory (RAM) and other memory, for example, ROM, EPROM, etc., for storing processor executable instructions controlling the operation and various functions and features of the wireless terminal, including the wireless transceiver and a satellite positioning system receiver discussed below. A user interface enables an operator of the device to provide inputs and receive outputs from the wireless terminal. These and other aspects of wireless communication terminals are known generally by those having ordinary skill in the art. While the exemplary wireless terminal 200 is in the form of a mobile communication handset powered by a battery 240, the communication terminal may be integrated with a vehicle navigation system.

In FIG. 2, the wireless terminal 200 also includes a satellite positioning system receiver 250 capable of receiving signals from satellites in a constellation of satellites orbiting a celestial body. In FIG. 1, satellites 150 and 152 constitute part of a satellite positioning system. Exemplary satellite positioning systems include the NAVSTAR satellite positioning system deployed by the United States, the Russian Glonass satellite positioning system and the Galileo satellite positioning system under development by the European Union. The satellite positioning system receiver 250 generally measures pseudoranges to multiple satellites and in some embodiments, computes its location based on the pseduorange measurements as discussed further below. As suggested in an alternative embodiment above, the satellite positioning system receiver enabled wireless communication terminal may be integrated with a vehicle navigation system.

The satellite positioning system may also be a satellite based communication system, for example, the Iridium satellite communication system, through which a wireless terminal may determine its position. More generally, the wireless terminal may obtain pseudorange measurements from earth-bound stations, for example, multiple cellular base transceiver stations alone or in combination with other location measuring entities, for example, location measuring units.

Some cellular communication networks provide wireless terminals with satellite positioning system assistance messages, which are received by the radio transceiver of the wireless terminal, for example, wireless transceiver 210 in FIG. 2. The satellite positioning system assistance information generally facilitates the measurement of pseudoranges by the satellite positioning system receiver. Exemplary assistance message information includes, but is not limited, to time, navigation information, Doppler, almanac, and code phase, among other information, depending on the particular assistance protocol implemented by the cellular network operator. Exemplary protocols are discussed below. The cellular communication network generally includes a satellite positioning system reference receiver, not illustrated in FIG. 1, but known generally by those having ordinary skill in the art. The reference receiver generally obtains satellite information either directly from satellites and/or from satellite positioning system models. The reference receivers or some other entity processes the satellite information and generates assistance messages, which are sent to the wireless terminals via the wireless network, for example, the exemplary cellular network 100 in FIG. 1. These and other aspects of satellite positioning system assistance architecture and functions are also known generally by those having ordinary skill in the art.

In FIG. 1, the exemplary base station controllers 110 are also communicably coupled to a serving mobile location center (SMLC) 140. In FIG. 1, location information for example latitude and longitude information or pseudorange (PR) measurements are communicated from satellite position system receiver enabled wireless terminals to the SMLC or other entity within the wireless network. For example, in MS-based location architectures, the wireless terminal computes location, for example, latitude and longitude coordinates, and provides the location coordinates to the serving mobile location center (SMLC). In MS-assist location architectures, the wireless terminal provides pseudorange measurements to the SMLC and the SMLC or some other entity computes the location of the terminal using the pseudorange measurements received from the terminal.

In FIG. 1, the exemplary SMLC is communicably coupled to a route map server 160 capable of providing routing information to the wireless terminal based on current location information of the terminal and a desired destination location. Architectures for routing vehicle based and handset based wireless communication terminals connected to wireless communication networks are known generally by those having ordinary skill in the art.

Figure 3:
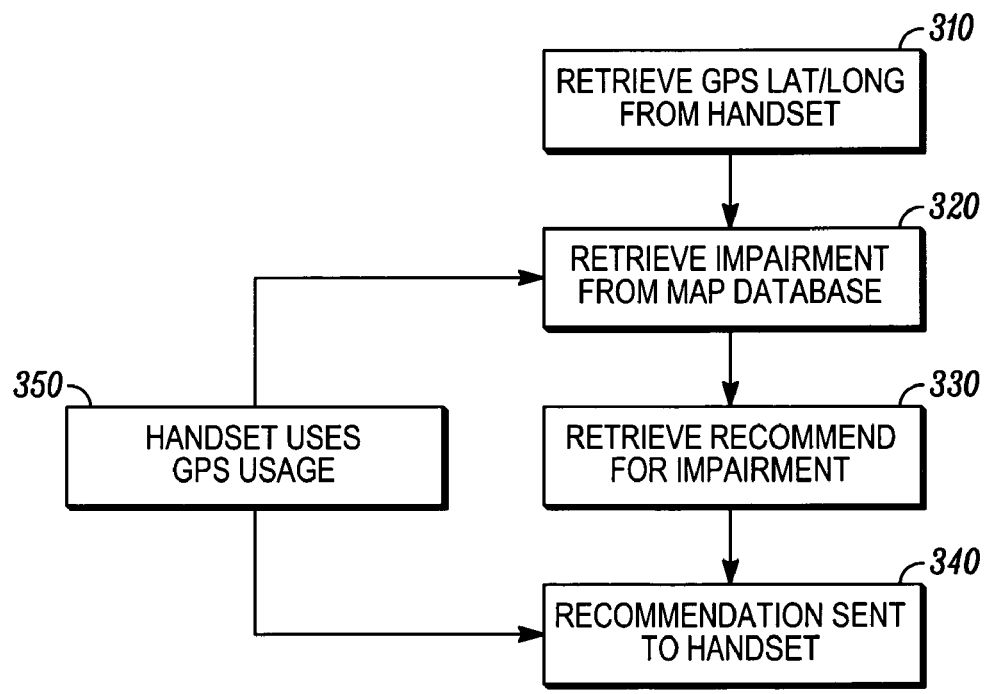
FIG. 3 is a process for implementing an exemplary embodiment of the disclosure.

In the process diagram 300 of FIG. 3, at 310, a network entity, for example, the SMLC 140 in FIG. 1, receives location information, for example, latitude/longitude coordinates, from a wireless communication terminal. At 320, impairment information is retrieved from a map database based on location information obtained at 310. At 330, the location information provided by the wireless terminal is used to obtain satellite positioning system operating mode information. The operating mode information is then provided to the wireless terminal, which uses the satellite positioning system receiver operating mode information to control operation of the satellite positioning system receiver. In FIG. 1, the operating mode of the satellite positioning system receiver is controlled by the processor under control of a program or application stored in memory based on operating mode instructions or recommendations received from the network, as discussed more fully below. In an alternative embodiment, the impairment information and recommendation information is stored locally on the satellite positioning system terminal, thus eliminating the need to communicate the location information to wireless from the terminal to a remote location/server.

In one embodiment, the wireless terminal or device, for example, the mobile terminal 102 in FIG. 1, receives satellite positioning system operating mode information based on its current location. The operating mode of the satellite positioning system receiver is then controlled based on the satellite positioning system operating mode information. In one application, the operating mode of the satellite positioning system receiver is controlled by controlling the power consumption of the satellite positioning system receiver and/or the allocation of processing resources to the satellite positioning system receiver. Battery power and/or computational resources may be conserved, for example, by suspending operation of the satellite positioning system receiver or by controlling the accuracy and/or frequency with which the satellite positioning system receiver or other positioning hardware computes pseudoranges and/or position. Alternative positioning hardware includes radio frequency receivers that determine position by measuring pseudoranges to fixed base or satellite stations and/or location measurement units. These and other alternative positioning system hardware and location schemes are known generally by those having ordinary skill in the art.

Another example of controlling the operating mode of the satellite positioning system receiver includes balancing requirements for position information and power consumption. For example, the user or terminal may be running an application, originating an E-911 call or responding to a location request from some other entity, or performing some other operation that requires location information generated by the satellite positions system receiver. In some devices, for example, in battery-powered mobile handsets, it may be desirable to balance the requirement for location information with the desire to conserve battery power. In other applications, it may be desirable to balance the requirement for location information with competing demands for limited processing power or memory usage, which is required to generate location information. In these and other applications, the resources allocated to support the computation of location information may be controlled based, for example, on a particular location of the mobile wireless communication device or based on a particular time, for example, a time interval.

Another example of controlling the operating mode of the satellite positioning system receiver includes controlling the generation of pseudorange measurements by the satellite positioning system receiver. For example, it may be determined based on the current location of the mobile terminal that certain satellites are not in view or that available satellite geometries are not particularly good or optimal, etc. Under these circumstances, the mobile terminal may be instructed to acquire alternate satellites or to acquire additional satellites, for example, to compute an over-determined position solution. In another example, indications of approaching difficult navigation areas such as urban canyons would enable the SPS receiver to acquire more satellites than what would normally be required for a location solution as it is expected some currently available satellites will be unavailable when the wireless terminal enters the urban canyon area. Alternatively, the wireless terminal may elect to suspend operation of the satellite positioning system receiver when satellite visibility conditions are not optimal and positioning information is not essential.

In some embodiments, there is an obstruction to the satellite positioning system signals, for example, when the wireless terminal enters a tunnel or an urban canyon or traverses some other terrain where there are known obstructions to or insufficiently strong satellite signals. In these instances, operation of the satellite positioning system receiver may be temporarily disabled or suspended or the frequency with which location measurements are made may be decreased. In other embodiments, the operating mode of the satellite positioning system receiver is controlled when the wireless terminal is constrained to a particular location or route, for example, while traveling along an Interstate road between exits. In these circumstances, for example, the frequency with which location measurements are made may be reduced. In some embodiments, for example, the wireless terminal may receive information indicating a time interval during which the satellite positioning system receiver reduces energy consumption, e.g., by reducing a number of or rate at which pseudorange measurements are made. In other embodiments, the mobile terminal receives information identifying a geographical range over which the satellite positioning system receiver may reduce its energy consumption, e.g., by reducing a number of or rate at which pseudorange measurements are made.

In FIG. 3, at 320, the satellite positioning system control information is based on one or more impairments to the satellite positioning system receiver. Exemplary impairments include obstruction of satellites based on the location of the wireless terminal, confinement of the wireless terminal, for example, in a fixed location, along a path, etc. The obstruction information may be obtained from a database based on the present position of the wireless terminal. As noted above, the position of the wireless terminal may be computed by the wireless terminal or it may be computed by some other entity based on pseudorange information provided by the wireless terminal.

In FIG. 1, a map database 160 is communicably coupled to the SMLC 140. The map database 160 correlates satellite impairment information with location information obtained from the SPS receiver. Thus satellite signal impairment information may be obtained based on the location of the wireless terminal using the map database. In FIG. 1, for example, for Lat/Long/Alt #1, there is a tunnel, which would impair satellite signal reception while the SPS receiver is within the tunnel. For Lat/Long/Alt #2, there is blockage of satellites in the East, for example, due to tall building or mountainous terrain.

The exemplary network in FIG. 1 also includes a route map server 170 capable of providing routing information based on a user's current position and based on an intended destination. In FIG. 1, the route map server 170 provides routing information to the communication terminal via the cellular network. The route map server is also communicably coupled to recommend database 180 that provide satellite positioning system receiver operating recommendations based on the impairment information identified by the map database 160.

In FIG. 3, at 330, a recommendation is obtained for the impairment identified at 320. At 340, the recommendation is sent to the wireless communication device, for example, in the form of satellite positioning system operating mode instruction or recommendation message. At 350, the wireless device controls the satellite positioning system receiver based on the recommendation sent. In some embodiments, the wireless terminal's usage of the recommendation is optional, for example, the user may have the option to enable/disable the usage at a control panel. In FIG. 2, generally, the processor 220 controls the operating mode of the satellite positioning system receiver 250 based on satellite positioning system operating mode information received by the wireless transceiver 210.

Thus, generally, the mobile wireless communication device is controlled when it is in a vicinity of the location on which the satellite positioning system operating mode information received from the recommend database is based. In FIG. 1, the recommend database 180 recommends that the satellite positioning system receiver be powered down when the wireless terminal enters the tunnel. For the case where the East satellites are obstructed, the wireless communication terminal may be recommended or instructed to disregard (not search for) specified satellites in the East sky. Where the wireless terminal enters an urban canyon, it may be recommended to revert to high sensitivity. In some routing and navigation applications, the location of the wireless terminal may be communicated relatively continuously to the route map server. In these applications, the wireless terminal may be provided recommendations for operating the satellite positioning system receiver dynamically. For example, when the terminal enters an area where satellites in the Eastern sky are obstructed, the satellite positioning system receiver may be recommended not to search for the obstructed satellites. Later, the receiver may be recommended to search for the satellites when the satellites become visible or available. Alternatively, the recommendations may be provided as a chain of commands for different waypoints provided at the beginning of the navigation operation or at different times of use.

For some navigation applications, there are varying requirements for an initial position location fix or determination, followed by accurate heading & speed reports intermixed with periods where no turn queuing information is needed. In some embodiments, the SPS receiver control or recommendation information is embedded within the navigation command stream provided to the wireless terminal by the routing server. In these embodiments, the SPS receiver control information is communicated to the wireless terminal over the same channel, for example, a cellular channel, as the navigation information. More generally, however, the SPS receiver control information could be communicated through a docking station or other wired or wireless connection such as Bluetooth or a Wireless Local Area Network.

In instances where the SPS receiver operation is suspended, at least insofar as the receiver is not acquiring satellites due to lack of availability, the suspension may begin upon entry into the tunnel and expire upon exiting the tunnel. Since the SPS receiver is not generating position fixes while it is in the tunnel, the resumption of SPS receiver operation may be based on an estimated time at which the wireless receiver exits the tunnel using velocity information and the known tunnel distance, which is available from the route map or map database. In some embodiments, the SPS receiver may be provided with information indicating what satellites to acquire at a particular time, for example, upon emerging from a tunnel or upon reaching some other location.

Figure 4:
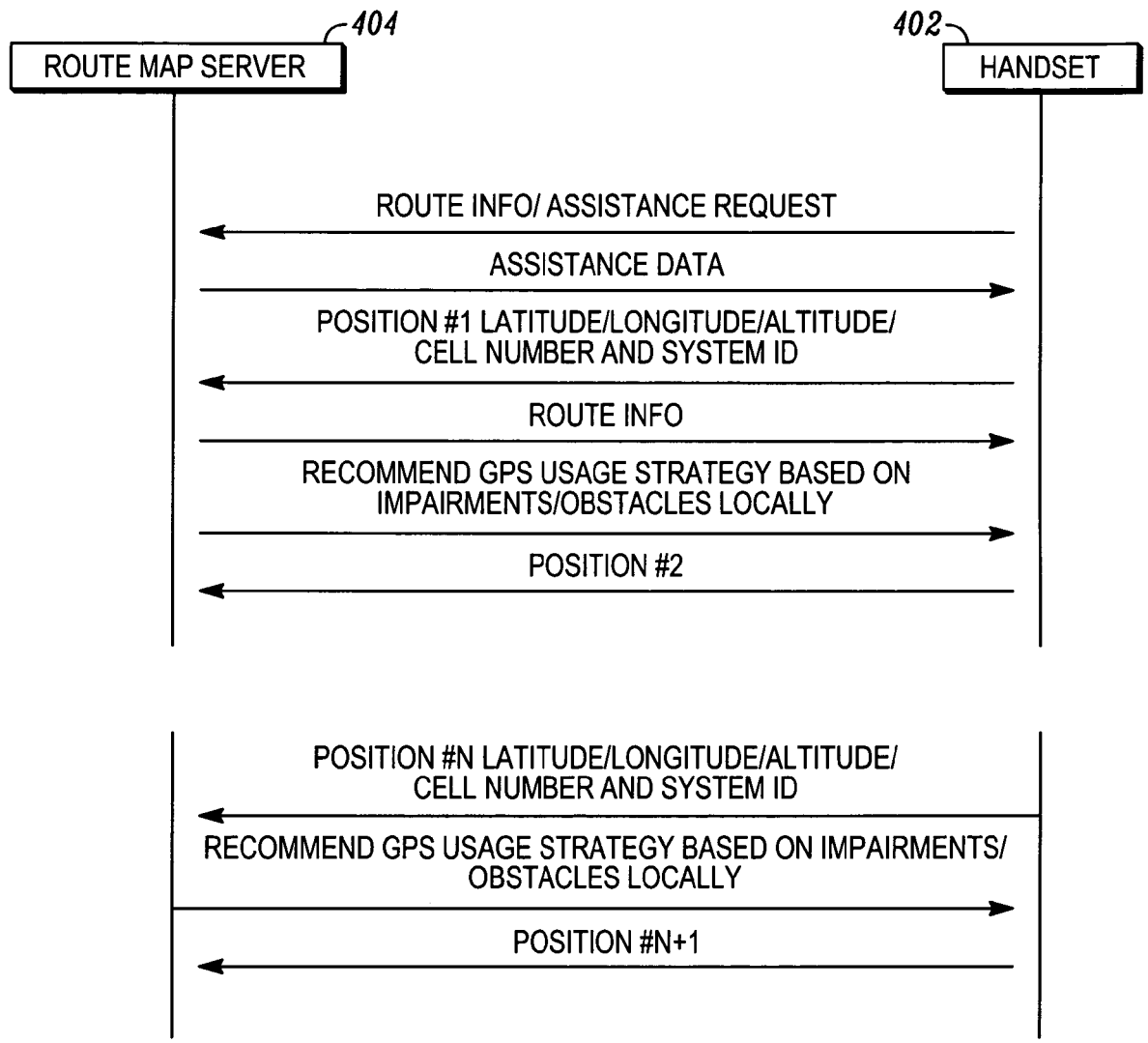
FIG. 4 is an exemplary message communication sequence for a mobile station based satellite positioning system location scheme.

In the exemplary SPS message sequence 400 of FIG. 4, a wireless handset 402 sends a request for routing/assistance information to a route map server 404. In some embodiments, the server sends assistance data to the handset in response to the request. Next, the handset sends location information, for example, location coordinates or pseudorange information in the form of latitude/longitude/altitude information to the route map server. In some embodiments, the handset may send cell and system information along with the position information. In some routing/navigation applications, the map routing server 404 may send routing information to the handset. The map server also sends SPS usage strategy information based upon local SPS obstructions/impairments. As discussed above, the strategy information may be part of the routing information or it may be transmitted in a separate message. The handset 402 then operates the SPS receiver according to the recommended SPS operating strategy. Thereafter, the strategy may be revised based upon changes in the location of the handset.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a satellite positioning system receiver enabled mobile wireless communication device, the method comprising:
   transmitting location information from the wireless communication device;
   receiving satellite positioning system operating mode information at the wireless communication device, the satellite positioning system operating mode information based on the location information transmitted from the wireless communication device;
   controlling the operating mode of the satellite positioning system receiver based on the satellite positioning system operating mode information.

2. The method of claim 1, controlling the operating mode of the satellite positioning system receiver includes balancing requirements for position information and power consumption.

3. The method of claim 1, controlling the operating mode of the satellite positioning system receiver includes balancing requirements for position information and power consumption based on a particular location of the mobile wireless communication device or a particular time.

4. The method of claim 1, controlling the operating mode of the satellite positioning system receiver includes controlling consumption of power by the satellite positioning system receiver.

5. The method of claim 1, controlling the operating mode of the satellite positioning system receiver includes controlling generating of pseudorange measurements by the satellite positioning system receiver.

6. The method of claim 1, controlling the operating mode of the satellite positioning system receiver includes controlling an accuracy with which the satellite positioning system receiver computes position.

7. The method of claim 1, receiving the satellite positioning system operating mode information at a wireless radio receiver of the wireless communication device.

8. The method of claim 1,
   receiving satellite positioning system operating mode information includes receiving information indicating a time interval during which the satellite positioning system receiver reduces energy consumption,
   reducing energy consumption of the satellite positioning system receiver during the time interval range identified.

9. The method of claim 1,
   receiving satellite positioning system operating mode information includes receiving information identifying a geographical range over which the satellite positioning system receiver may reduce energy consumption,
   reducing energy consumption of the satellite positioning system receiver when the mobile wireless communication device traverses the geographical range identified.

10. A mobile wireless communication device comprising:
    a processor;
    a wireless transceiver communicably coupled to the processor, the wireless transceiver capable of receiving satellite positioning system operating mode information based on location information of the wireless communication device;
    a satellite positioning system receiver coupled to the processor,
    the processor controlling an operating mode of the satellite positioning system receiver based on satellite positioning system operating mode information received by the wireless transceiver when the mobile wireless communication device is in a vicinity of a location on which the location information of the wireless communication device is based.

11. The device of claim 10 is a battery powered mobile wireless communication device including a battery coupled to the controller.

12. The device of claim 10, the processor controlling the operating mode of the satellite positioning system receiver by balancing requirements for position information generated by the satellite positioning system receiver and power consumption of the satellite positioning system receiver.

13. The device of claim 10, the processor controlling the operating mode of the satellite positioning system receiver by balancing requirements for position information and power consumption based on a particular location of the mobile wireless communication device or a particular time.

14. The device of claim 10, the processor controlling the operating mode of the satellite positioning system receiver by controlling power consumption by the satellite positioning system receiver.

15. The device of claim 10, the processor controlling the operating mode of the satellite positioning system receiver by controlling a rate at which the satellite positioning system receiver obtains pseudorange measurements or a number of pseudorange measurements obtained by the satellite positioning system receiver for a particular position computation.

16. The device of claim 10, the processor controlling the operating mode of the satellite positioning system receiver by controlling an accuracy with which the satellite positioning system receiver computes position.

17. The device of claim 10, the processor controlling an operating mode of the satellite positioning system receiver by reducing energy consumption of the satellite positioning system receiver when the mobile wireless communication device traverses a geographical range identified in the received satellite positioning system operating mode information.

18. A mobile wireless communication device comprising:
a processor;
a wireless transceiver communicably coupled to the processor,
the wireless communication device configured to operate in a positioning measurement operating mode wherein the wireless communication device obtains positioning measurements from distant entities,
the wireless transceiver configured to receive positioning system operating mode information based on a location of the wireless communication device;
the processor controlling the positioning measurement operating mode of the wireless communication device based on positioning system operating mode information received by the wireless transceiver.

19. A mobile wireless communication device comprising:
a processor;
memory coupled to the processor, the memory storing location based satellite positioning system operating mode information;
a position determination entity coupled to the processor, the position determination entity capable of determining a position of the mobile wireless communication device,
the processor controlling an operating mode of the position determination entity based on satellite positioning system operating mode information stored in memory and based on a location of the mobile wireless communication device.

20. The device of claim 19, the position determination entity is one of a satellite positioning system receiver and a wireless transceiver.

* * * * *